(12) United States Patent
Park

(10) Patent No.: US 11,624,451 B2
(45) Date of Patent: Apr. 11, 2023

(54) EMERGENCY CONTROL DEVICE AND METHOD FOR SPRING RETURN VALVE ACTUATOR

(71) Applicant: NOAH ACTUATION CO., LTD., Incheon (KR)

(72) Inventor: Soon Won Park, Seongnam-si (KR)

(73) Assignee: NOAH ACTUATION CO., LTD., Incheon (KR)

( * ) Notice: Subject to any disclaimer, the term of this patent is extended or adjusted under 35 U.S.C. 154(b) by 307 days.

(21) Appl. No.: 17/124,775

(22) Filed: Dec. 17, 2020

(65) Prior Publication Data
US 2021/0222790 A1    Jul. 22, 2021

(30) Foreign Application Priority Data

Jan. 17, 2020   (KR) .................. 10-2020-0006517

(51) Int. Cl.
    *F16K 31/04*     (2006.01)
    *H02P 3/08*      (2006.01)

(52) U.S. Cl.
    CPC .............. *F16K 31/047* (2013.01); *H02P 3/08* (2013.01)

(58) Field of Classification Search
    CPC .................. F16K 31/047; H02P 3/08
    See application file for complete search history.

(56) References Cited

U.S. PATENT DOCUMENTS

| | | | |
|---|---|---|---|
| 4,613,798 A * | 9/1986 | Baumann .............. | F16K 31/046 318/40 |
| 8,360,393 B2 * | 1/2013 | Park ...................... | F16K 31/53 251/71 |
| 9,231,500 B2 * | 1/2016 | Marcetic ................ | H02P 21/36 |

FOREIGN PATENT DOCUMENTS

| | | |
|---|---|---|
| JP | 10122417 A | 5/1998 |
| JP | 2004044766 A | 2/2004 |
| JP | 2004150620 A | 5/2004 |
| JP | 2005214299 A | 8/2005 |
| JP | 2019078295 A | 5/2019 |
| JP | 2019196815 A | 11/2019 |
| KR | 101130983 B1 | 3/2012 |

\* cited by examiner

*Primary Examiner* — Eric Keasel
(74) *Attorney, Agent, or Firm* — Greer Burns & Crain Ltd.

(57) ABSTRACT

The present invention relates to an emergency control device for a spring return valve actuator, the device including: a power source unit for receiving an alternating current (AC) power source, converting and stepping down an AC voltage of the received AC power source to a given direct current (DC) voltage, and supplying the DC voltage, and transmitting a signal as to whether the power source is supplied; a charge unit for receiving the DC voltage from the power source unit to store electrical energy with a given voltage; and a control unit for receiving the DC voltage from the power source unit to supply the received DC voltage to the electromagnetic brake, and if a power source cutoff signal is received from the power source unit, for supplying the electrical energy stored in the charge unit to the electromagnetic brake for a given set time.

10 Claims, 7 Drawing Sheets

EMERGENCY CONTROL DEVICE AND METHOD FOR SPRING RETURN VALVE ACTUATOR

CROSS REFERENCE TO RELATED APPLICATION OF THE INVENTION

The present application claims the benefit of Korean Patent Application No. 10-2020-0006517 filed in the Korean Intellectual Property Office on Jan. 17, 2020, the entire contents of which are incorporated herein by reference.

BACKGROUND OF THE INVENTION

Field of the Invention

The present invention relates to a valve actuator, and more particularly, to an emergency control device and method for a spring return valve actuator that is capable of avoiding a valve from being returned to a fail open or closed state, if the spring return valve actuator wherein the valve is configured to be in the fail open or closed state by means of a restoring force of a spiral spring upon the occurrence of an emergency is under a temporary power outage like a transient power failure and instantaneous voltage drop, thereby in advance preventing unnecessary situations from happening to thus control the valve efficiently.

Background of the Related Art

As well known, a fluid flow is controlled by means of a valve in facilities like HAVC or various plant facilities using or treating a fluid. There are different types and shapes of valves according to the types or purposes of fluids, and so as to allow a fluid to be easily controlled, generally, operations for opening and closing the valve are controlled automatically by means of an actuator.

To do this, the actuator is attached to a ball valve, a butterfly valve, or a damper mounted on a pipe along which various fluids flow to automatically control the opening and closing of the corresponding valve.

According to operating methods of the actuator, the actuator is classified into a pneumatic type actuator that is operated with a force of compressed air and an electric type actuator that is operated by means of an electric motor. The pneumatic type actuator has to be provided with air pressure on a site, and accordingly, the electric type actuator relatively simple in use is generally used.

On the other hand, the electric actuator for driving the valve is also provided with an emergency opening and closing device for urgently closing or opening the valve so as to prevent accidents caused by an unexpected emergency, for example, a power outage, from happening.

According to operating ways upon the occurrence of the emergency, the emergency opening and closing device is classified into a spring return type device using a restoring force of a spiral spring and a condenser type device using a condenser, and in this case, the spring return type device capable of very quickly opening and closing the valve upon a power outage, is generally used.

Such a spring return type electric valve actuator (hereinafter referred to simply as "spring return valve actuator") is provided with a spiral spring located on a valve shaft so that during a typical operation of the valve, the spiral spring is tightened by means of a rotary force of a motor rotating the valve in such a manner as to be fixed to an electromagnetic brake, and if the rotary force of the motor disappears upon the occurrence of a power outage, the valve is forcedly open and closed by means of the elastic restoring force of the tightened spiral spring.

A conventional spring return valve actuator as issued to the same applicant as the present invention is disclosed in Korean Patent No. 10-1130983 entitled 'spring return valve actuator using one planetary gear body'.

The conventional spring return valve actuator includes a first worm unit having a first worm shaft and a first worm wheel fitted to a rotary shaft of a motor, a second worm unit having a second worm shaft extended from a first worm wheel shaft and a second worm wheel, a planetary gear unit having a sun gear coaxial to the second worm wheel and an output shaft located on a planetary gear carrier, a spring unit coupled to the output shaft and having a stopper and a spiral spring for limiting a degree of opening of a valve to a given angle, an electromagnetic brake unit having a brake gear engaging with a ring gear of the planetary gear unit in such a manner as to restrain the ring gear, and a variable worm shaft engaging selectively with the ring gear by means of a lever to manually open and close the valve. Through a relatively small and simple configuration, accordingly, the conventional spring return valve actuator can be operated accurately upon the occurrence of a power outage and of course can manually open and close the valve in a simple manner.

However, as shown in FIG. 1, the motor M of the conventional spring return valve actuator is connected directly to a power source, and an electromagnetic brake B is connected to a power source part P for simply and converting and stepping down the power source to a given direct current (DC) voltage, so that once a blackout or voltage drop occurs, irrespective of types of power outages, the restraint of the electromagnetic brake unit is released to allow the valve to be operated to a fail open or closed state by means of the restoring force of the spiral spring.

As a result, even if a temporary power outage naturally returned quickly to a normal state, that is, a transient power failure or instantaneous voltage drop occurs, the valve becomes in the fail open or closed state, so that many works have to be carried out unnecessarily.

In specific, the transient power failure or instantaneous voltage drop may be typically normalized as soon as possible, but as the valve has been in the fail open or closed state, the valve has to be returned to its normal state by means of the motor or manually, which undesirably causes unnecessary power, time, and labor consumption.

The transient power failure or instantaneous voltage drop occurs often particularly if power qualities by district are remarkably different or deteriorated or in seasons where power consumption excessively increases, and in this case, the above-mentioned problems happen more often, which causes a bad influence on the reliability of the actuator.

SUMMARY OF THE INVENTION

Accordingly, the present invention has been made in view of the above-mentioned problems occurring in the related art, and it is an object of the present invention to provide an emergency control device for a spring return valve actuator that is capable of avoiding a valve from being returned to a fail open or closed state if the spring return valve actuator is under a temporary power outage like a transient power failure and instantaneous voltage drop, thereby in advance preventing unnecessary situations from occurring.

It is another object of the present invention to provide an emergency control method for a spring return valve actuator that is capable of being adequate to provide an emergency control device for a spring return valve actuator.

To accomplish the above-mentioned objects, according to one aspect of the present invention, there is provided an emergency control device for a spring return valve actuator including a motor adapted to open and close a valve, a spiral spring adapted to forcedly open and close the valve if an emergency occurs, and an electromagnetic brake adapted to allow the spiral spring to be fixed to a tightened state, the device including: a power source unit for receiving an alternating current (AC) power source, converting and stepping down an AC voltage of the received AC power source to a given direct current (DC) voltage, and supplying the DC voltage, and transmitting a signal as to whether the power source is supplied; a charge unit for receiving the DC voltage from the power source unit to store electrical energy with a given voltage; and a control unit for receiving the DC voltage from the power source unit to supply the received DC voltage to the electromagnetic brake, and if a power source cutoff signal is received from the power source unit, for supplying the electrical energy stored in the charge unit to the electromagnetic brake for a given set time.

According to the present invention, desirably, the power source unit includes rectifying parts for converting the AC voltage of the AC power source into the DC voltage and a transforming part connected to an output side of the rectifying parts to step down the AC voltage of the AC power source to the given DC voltage and having an auxiliary winding provided on a secondary side thereof to transmit the signal as to whether the power source is supplied to the control unit.

Desirably, the transforming part is composed of a switching transformer for performing constant current charging to the charge unit, and desirably, the charge unit is composed of a super capacitor having excellent capacitance.

According to the present invention, desirably, the control unit includes: a microprocessor; a voltage detecting part for measuring a charging voltage of the charge unit to transmitting the measured value to the microprocessor; and a delay time setting part for setting a given power source cutoff delay time for the electromagnetic brake if the power source supply to the power source unit is cut off.

Desirably, the control unit further includes a display part for displaying the charging voltage of the charge unit and the power source cutoff delay time for the electromagnetic brake. Desirably, the display part selectively displays the charging voltage of the charge unit and the power source cutoff delay time for the electromagnetic brake according to the signal as to whether the power source is supplied received from the power source unit.

To accomplish the above-mentioned objects, according to another aspect of the present invention, there is provided an emergency control method for a spring return valve actuator including a motor adapted to open and close a valve, a spiral spring adapted to forcedly open and close the valve if an emergency occurs, and an electromagnetic brake adapted to allow the spiral spring to be fixed to a tightened state, the method including the steps of: stepping down an alternating current (AC) power source to a given direct current (DC) voltage and supplying the DC voltage; transmitting a signal as to whether the power source is supplied; charging electrical energy to a capacitor with the stepped down DC voltage; supplying the stepped down DC voltage to the electromagnetic brake after the charging to the capacitor is completed; setting a power source cutoff delay time for the electromagnetic brake if the power source is cut off; and if a power source cutoff signal is received, supplying the electrical energy charged to the capacitor to the electromagnetic brake for the power source cutoff delay time set by a control unit.

According to the present invention, desirably, the emergency control method further includes the step of measuring a charging voltage of the capacitor to output the measured value to the control unit, so that only when the charging voltage of the capacitor is more than a given voltage, the control unit supplies the charging voltage to the electromagnetic brake.

Desirably, the emergency control device further includes the step of displaying the charging voltage of the capacitor and the power source cutoff delay time for the electromagnetic brake on a display part. Desirably, the control unit controls the display part to display the charging voltage of the capacitor if a power source supply signal is received and to display the power source cutoff delay time for the electromagnetic brake if the power source cutoff signal is received.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE EMBODIMENTS

Characteristics and advantages of an emergency control device and method for a spring return valve actuator according to the present invention will be more clearly understood from the detailed description as will be described below and the attached drawings.

Figure 1:
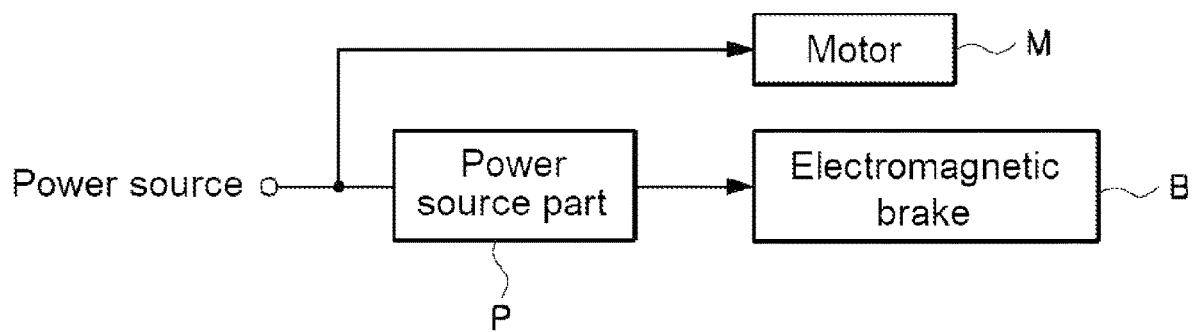
FIG. 1 is a schematic block diagram showing a power source connection configuration of a conventional spring return valve actuator.
Figure 2:
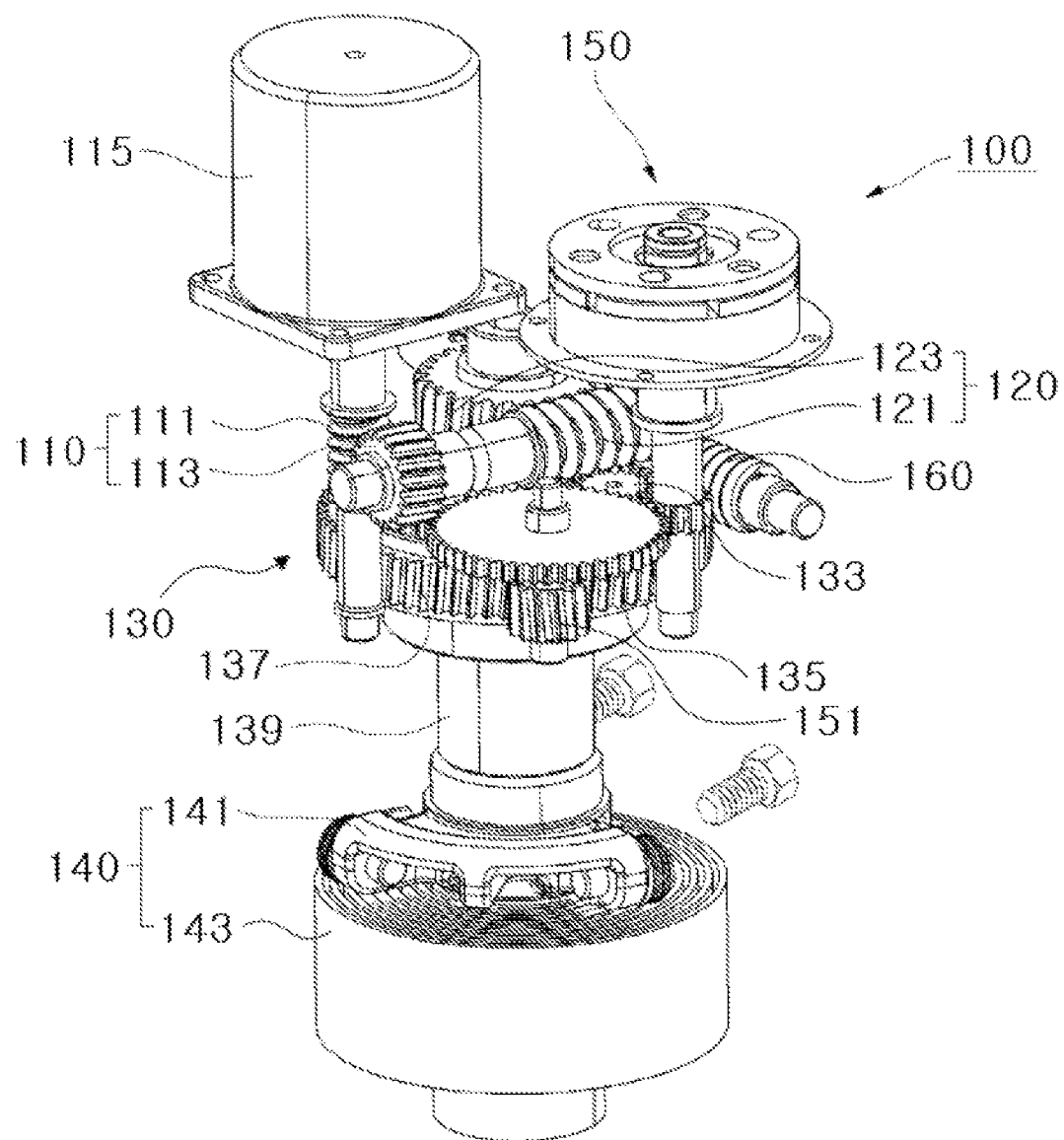
FIG. 2 is a perspective view showing an example of a spring return valve actuator to which an emergency control device according to the present invention is applied.

Referring first to FIG. 2, a spring return valve actuator 100 to which an emergency control device according to the present invention is applied will be explained. The spring return valve actuator 100 is disclosed in Korean Patent No. 10-1130983 issued to the same applicant as the present invention.

The spring return valve actuator 100 includes a first worm unit 110 having a first worm shaft 111 and a first worm wheel 113 fitted to a rotary shaft of a motor 115, a second worm unit 120 having a second worm shaft 121 extended from a first worm wheel shaft and a second worm wheel 123, a planetary gear unit 130 having a sun gear (not shown) coaxial to the second worm wheel 123 and an output shaft 139 located on a planetary gear carrier 137 for supporting a plurality of planetary gears 133, a spring unit 140 coupled to the output shaft 139 and having a stopper 141 and a spiral spring 143 for limiting a degree of opening of a valve to a given angle, an electromagnetic brake 150 having a brake gear 151 engaging with a ring gear 135 of the planetary gear unit 130 in such a manner as to restrain the ring gear 135 in a state where the spiral spring 143 is tightened, and a variable worm shaft 160 engaging selectively with the ring gear 135 by means of a lever (not shown) to manually open and close the valve.

If a power source is supplied, the ring gear 135 is fixed by means of the electromagnetic brake 150 to allow the spiral spring 143 to be restrained tightenedly, and according to the principle of the planetary gear, the rotary force of the motor 115 is transferred to the output shaft 139.

If the power source is cut off by an emergency like a power outage, in this state, the ring gear 135 is released from the restraint, and by means of the restoring force of the spiral spring 143, the valve is forcedly rotated in such a manner as to be returned to a fail open or fail closed state, thereby quickly responding to the emergency.

Figure 3:
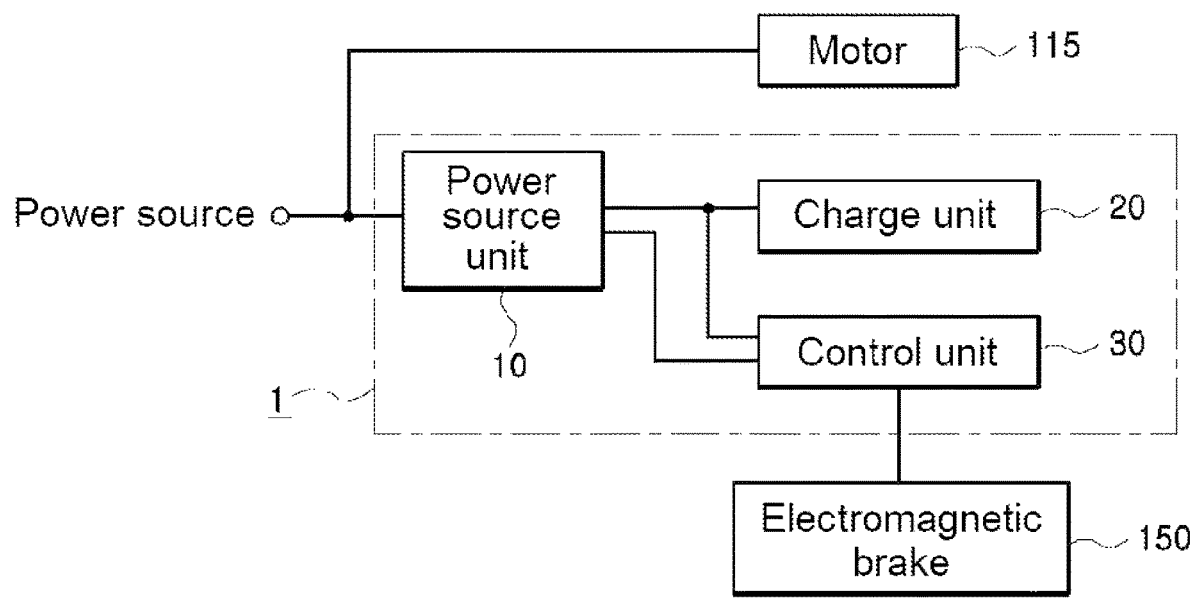
FIG. 3 is a schematic block diagram showing the emergency control device for a spring return valve actuator according to the present invention.

When an emergency occurs in the spring return valve actuator 100 as mentioned above, an emergency control device 1 according to the present invention is capable of controlling an operation of the valve more reasonably, and as shown in FIG. 3, the emergency control device 1 according to the present invention includes a power source unit 10, a charge unit 20, and a control unit 30.

The power source unit 10 receives an AC power source of 110 to 220 V, converts and steps down the received AC power source to DC power source of 24 to 27 V, and supplies the DC power source to the charge unit 20 and the control unit 30. Also, the power source unit 10 generates a signal as to whether the power source is supplied to the power source unit 10 and transmits the generated signal to the control unit 30.

Figure 4:
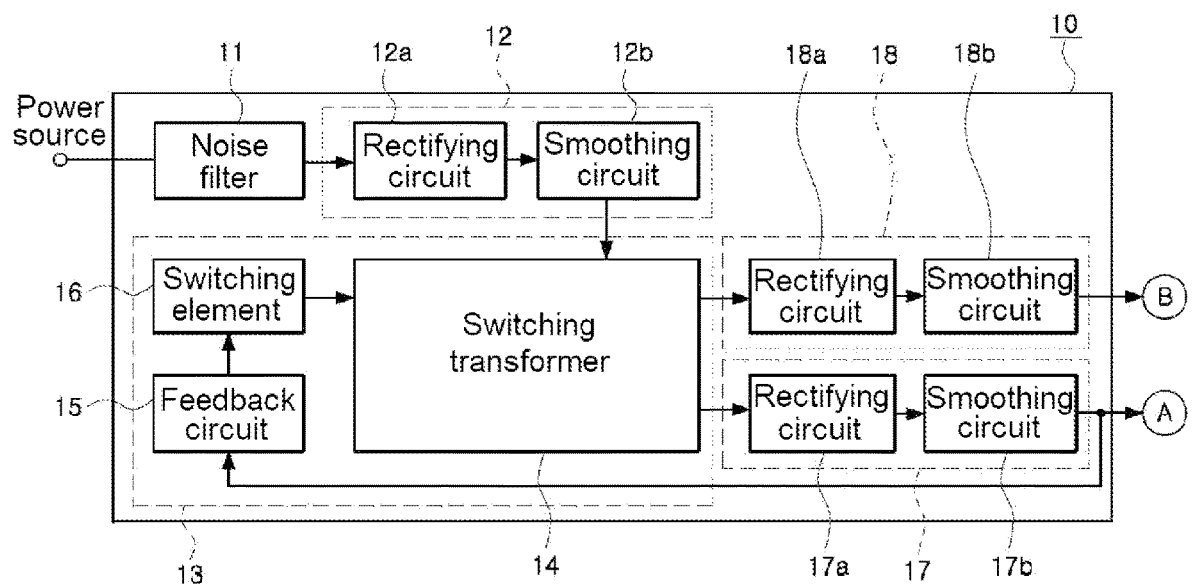
FIG. 4 is a block diagram showing a power source unit of the emergency control device according to the present invention.

To do this, as shown in FIG. 4, the power source unit 10 includes a noise filter 11, rectifying parts 12, 17, and 18, and a transforming part 13. The noise filter 11 blocks electromagnetic noise received from the outside, while preventing the noise generated at the inside of the power source unit 10 from being discharged to the outside, and the noise filter 11 is configured of a typical EMI/EMC filter.

The first rectifying part 12 includes a first rectifying circuit 12a for converting the AC power source passing through the noise filter 11 into the DC power source and a first smoothing circuit 12b for reducing ripple current of the DC power source outputted from the first rectifying circuit 12a to convert the ripple current into complete DC.

The transforming part 13 steps down the AC power source to the DC power source of 24 to 27 V as needed to operate the electromagnetic brake 150 and outputs the DC power source. Desirably, the transforming part 13 is composed of a switching transformer 14 capable of performing constant current charging to prevent the charge unit 20 from being damaged due to excessive charging current.

In addition to the switching transformer 14, as well known, the transforming part 13 further includes a feedback circuit 15 and a switching element 16 to transfer electrical energy to a secondary side from a primary side by means of a switching operation, and generally, a switching speed is controlled according to a voltage value induced to the secondary side, thereby constantly maintaining a set output voltage value.

According to the present invention, however, the switching speed is controlled according to the current value flowing to the secondary side so as to perform the constant current charging, thereby preventing the charge unit 20 from being damaged due to excessive charging current and stably performing the charging operation.

That is, a capacitor as will be discussed later constituting the charge unit 20 is short-circuited when it is completely discharged, and accordingly, if a high voltage is applied upon initial charging, large inrush current of tens to hundreds of amperes flows momentarily to cause the capacitor or board constituting the charge unit 20 to be damaged. Accordingly, the present invention is provided with the transforming part 13 configured to have the switching transformer 14 capable of performing the constant current charging to ensure a constant output value.

Figure 5:
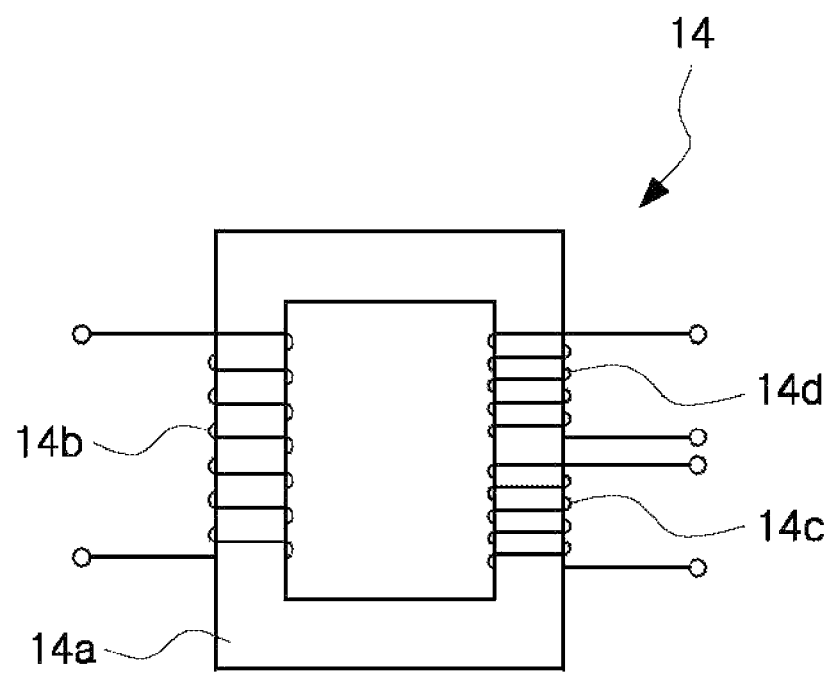
FIG. 5 is a schematic circuit diagram showing a transforming part of the power source unit in the emergency control device according to the present invention.

On the other hand, as shown in FIG. 5, the transforming part 13 includes the switching transformer 14 having a main winding 14c for generating output of a given DC voltage, for example, 24-27 V to the secondary side and an auxiliary winding 14d for generating the signal as to whether the power source is supplied or not.

A primary side winding 14b to which the power source is applied is wound on one side of an iron core 14a, and the main winding 14c and the auxiliary winding 14d are wound on the other side of the iron core 14a in such a manner as to be opposite to the primary side winding 14b.

The main winding 14c is connected in parallel with a power supply part 36 and a voltage detecting part 32 of the control unit 30 as will be discussed later and supplies operating power to the electromagnetic brake 150 through a relay 34 as will be discussed later.

The auxiliary winding 14d is connected to a microprocessor 31 of the control unit 30 as will be discussed later. For example, if a power source is supplied, the auxiliary winding 14d transmits a signal "1=HIGH" to the microprocessor 31, and if a power source is cut off, the auxiliary winding 14d transmits a signal "0=LOW" to the microprocessor 31, so that the control unit 30 determines a control time point of the electromagnetic brake 150.

Also, the main winding 14c is connected to the second rectifying part 17 composed of a second rectifying circuit 17a and a second smoothing circuit 17b, and the auxiliary winding 14d is connected to the third rectifying part 18 composed of a third rectifying circuit 18a and a third smoothing circuit 18b, so that the stepped down voltage in the transforming part 13 is rectified through the second rectifying part 17 and the third rectifying part 18.

The charge unit 20 is desirably composed of a super capacitor having good capacitance performance. The super capacitor is configured to have a plurality of capacitors (not shown) with a given capacitance mounted on one board, and the total capacitance of the super capacitor is the sum of the capacitances of the plurality of capacitors.

The charge unit 20 is connected in parallel with the control unit 30, and if the power source is not supplied from the power source unit 10, the charge unit 20 automatically supplies stored electrical energy to the control unit 30.

The control unit 30 receives the DC power source from the power source unit 10 to supply the DC power source to the electromagnetic brake 150, and if the control unit 30 receives a power source cutoff signal from the power source unit 10, the control unit 30 supplies the electrical energy stored in the charge unit 20 to the electromagnetic brake 150 for a given time.

Figure 6:
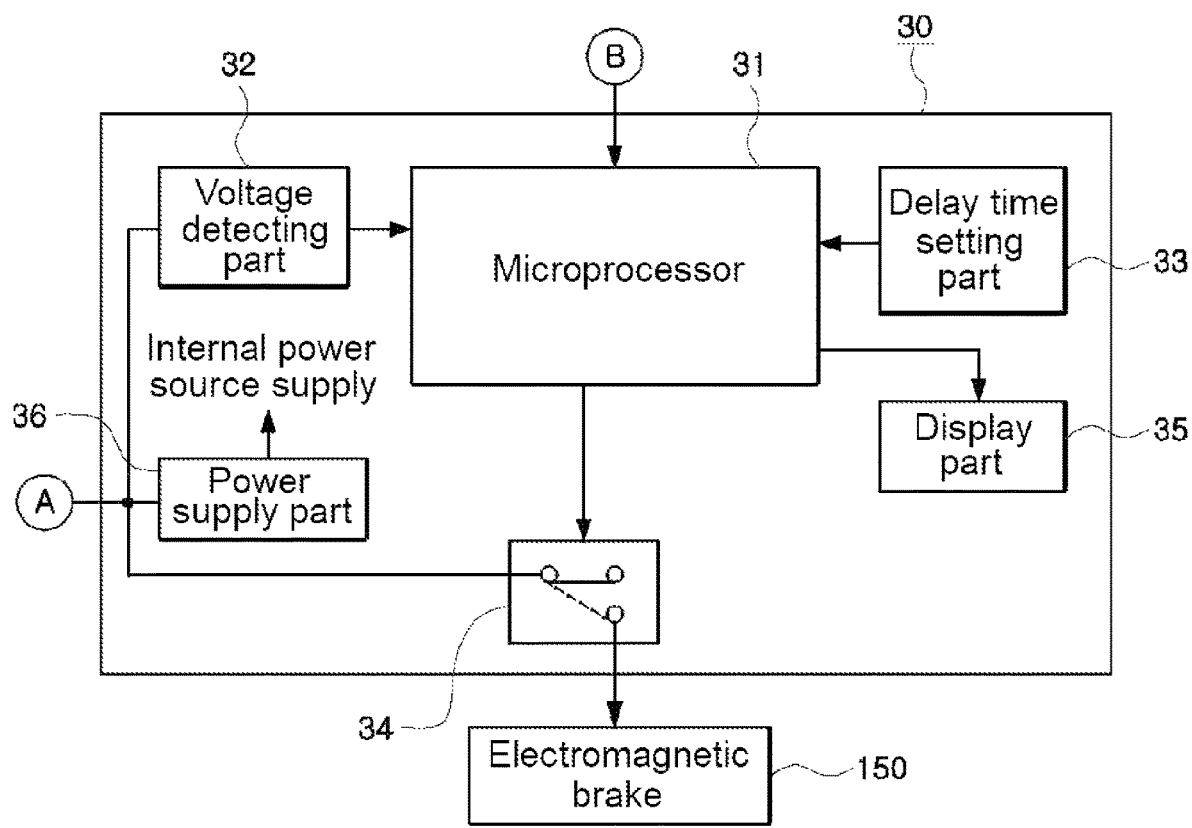
FIG. 6 is a block diagram showing a control unit of the emergency control device according to the present invention.

To do this, as shown in FIG. 6, the control unit 30 includes the microprocessor 31, the voltage detecting part 32, a delay time setting part 33, a display part 35, and the power supply part 36.

All kinds of data and given logics for the control operation are programmed in the microprocessor 31, and only when a charging voltage of the charge unit 20 is more than a given set voltage, for example, 25 V, desirably, the power source supply to the electromagnetic brake 150 is programmed. This is based on that the rated voltage of the electromagnetic brake 150 is, for example, 24 V, and so as to perform the power source supply to the electromagnetic brake 150 through the microprocessor 31, accordingly, the charging voltage of the charge unit 20 is determined according to the rated voltage of the electromagnetic brake 150.

The microprocessor 31 performs the power source supply or power source cutoff to and from the electromagnetic brake 150 through on/off control of the relay 34 connecting the power source supplied from the power source unit 10 to the electromagnetic brake 150.

The voltage detecting part 32 is connected to the charge unit 20 to measure the charging voltage of the charge unit 20 and thus transfers the measured value to the microprocessor 31. As a result, the microprocessor 31 compares the voltage received from the voltage detecting part 32 with the programmed set voltage to determine whether the power source is supplied to the electromagnetic brake 150.

If a power source cutoff signal is inputted to the microprocessor 31 from the power source unit 10, the delay time setting part 33 sets a given delay time during which the microprocessor 31 determines whether a temporary power outage like a temporary blackout like instantaneous voltage drop or am emergency occurs.

Even if the power source cutoff signal is inputted, that is, the microprocessor 31 determines that the temporary power outage occurs for the set delay time and allows the relay 34 to be kept turned "on" by means of the energy of the charge unit 20, so that the power source supply to the electromagnetic brake 150 is kept still. After that, if a power source supply signal is inputted again before the set delay time is finished, the microprocessor 31 determines that the temporary power outage occurs to allow the relay 34 to be kept turned "on". If the power source cutoff signal is kept while the set delay time is being passed, the microprocessor 31 determines that the emergency occurs to allow the relay 34 to be turned "off", so that the power source supply to the electromagnetic brake 150 is cut off.

Accordingly, the ring gear 135 is released from the restraint, and through the restoring force of the spiral spring 143, the valve operates to a fail open or fail closed state, thereby quickly responding to the emergency.

As the time needed for normalizing the transient power failure or instantaneous voltage drop is dependent upon qualities of power, that is, countries or districts, power consumption, and so on, the set delay time of the delay time setting part 33 is set with a user's arbitrary value according to the district where the valve is used.

The display part 35 displays the charging voltage of the charge unit 20 and the power source cutoff delay time for the electromagnetic brake 150 with numbers so that the charging voltage and the power source cutoff delay time can be recognized at the outside. The display part 35 is composed of, for example, LED segments (typically referred to as "seven-segment display").

The display part 35 can display both of the charging voltage and the delay time, but it is enough if the delay time is recognized only upon the setting and the power source cutoff, unlike the charging voltage which has to be always checked, so that desirably, the charging voltage and the delay time are selectively displayed on one segment if necessary.

That is, the display part 35 normally displays the charging voltage of the charge unit 20, and only when the delay time is set or the power source cutoff signal is received from the power source unit 10, the delay time is displayed on the display part 35 through the control of the microprocessor 31.

The power supply part 36 is composed of a switched mode power supply (SMPS) that stably generates and supplies all types of power sources needed to drive the parts of the control unit 30.

Figure 7:
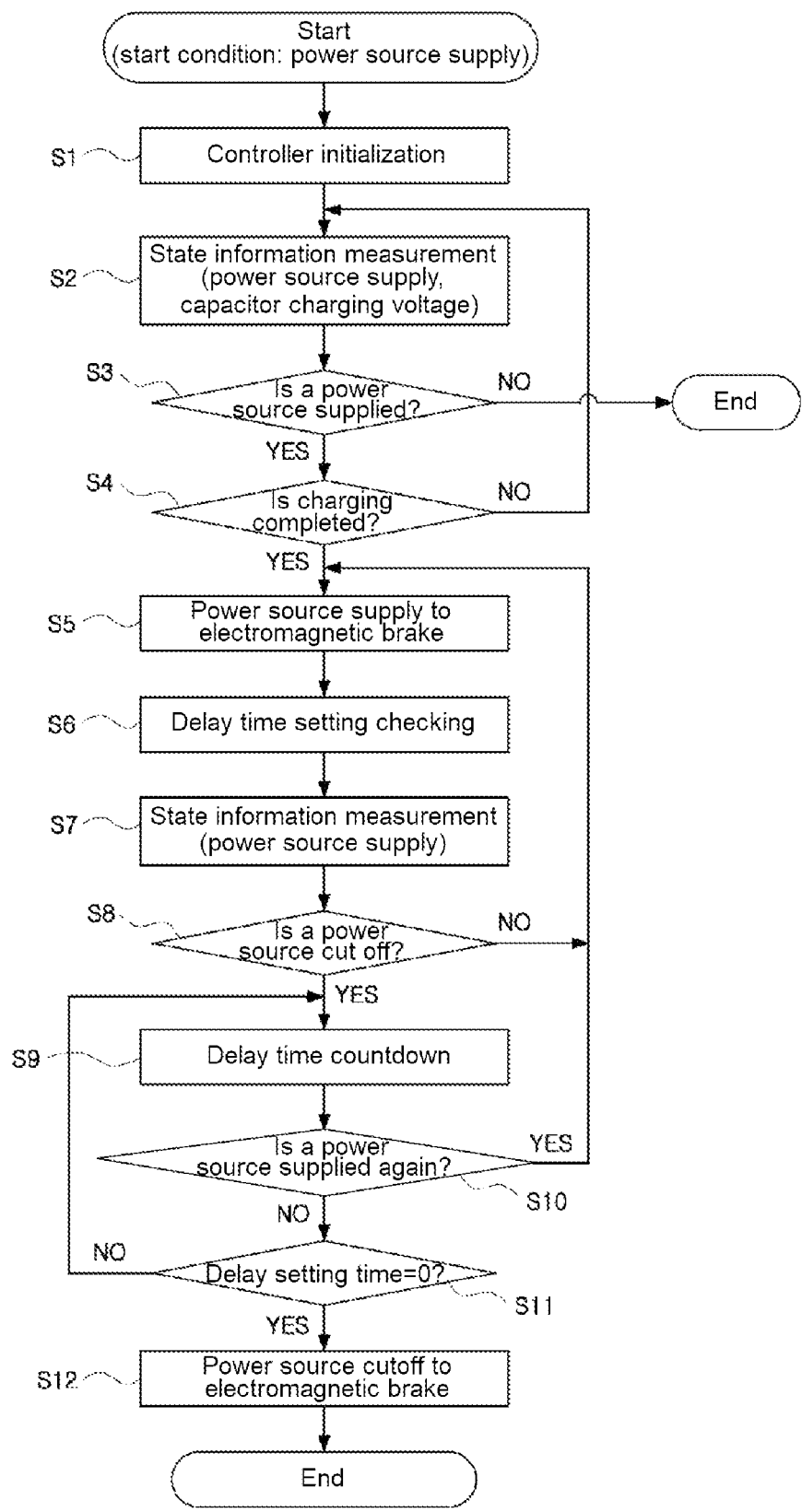
FIG. 7 is a flowchart showing operations of the emergency control device according to the present invention.

Under the above-mentioned configuration, next, an explanation on operations of the emergency control device for the spring return valve actuator according to the present invention will be given with reference to FIG. 7.

If a power source is supplied at step S1, the control unit 30 is first initialized to set input and output ports and is also ready in advance to control an operating frequency and the like. Simultaneously, charging to the charge unit 20 is carried out by means of the DC voltage supplied from the power source unit 10.

At step S2, the control unit 30 measures state information on whether the power source is supplied, the charging voltage value of the capacitor, etc., so as to determine whether control starts. Whether the power source is supplied is measured through a signal inputted to the microprocessor 31 from the auxiliary winding 14d of the transforming part 13 of the power source unit 10, and the measurement of the charging voltage value of the capacitor is performed through the voltage detecting part 32.

At step S3, the microprocessor 31 determines whether the power source is supplied or not. If it is determined that the power source is not supplied, the control is finished, and if it is determined that the power source is supplied, at step S4, the microprocessor 31 measures whether the charging to the capacitor is completed.

If the charging is not completed, the step S4 is returned to the step S2, and if the charging is completed, the microprocessor 31 turns the relay 34 "on" at step S5 to allow the DC voltage supplied from the power source unit 10 to be supplied to the electromagnetic brake 150.

As a result, the ring gear 135 of the planetary gear unit 130 that engages with the brake gear 151 is restrained, and according to the principle of the planetary gear, the rotary force of the motor 115 is transferred to the output shaft 139.

At step S6, the power source cutoff delay time for the electromagnetic brake 150 is set through the delay time setting part 33 by the user. The delay time can be checked through the display part 35. If the delay time setting is completed, the charging voltage of the capacitor is displayed on the display part 35.

On the other hand, the valve is operated in this state, and at step S7, during the operation, the microprocessor 31 measures whether the power source is consistently supplied through the signal as to whether the power source is supplied or not, which is received from the power source unit 10.

In this case, if the power source supply to the power source unit 10 is cut off by means of a power outage like a transient power failure or instantaneous voltage drop, at step S8, the microprocessor 31 determines whether the power source is cut off through the signal received from the power source unit 10.

As a result, if it is determined that the power source is not cut off, the step S8 is returned to the step S5, and if it is determined that the power source is cut off, at step S9, the energy stored in the charge unit 20 as the power source needed for the electromagnetic brake 150 is consistently supplied for the set delay time. Accordingly, the ring gear 135 is kept restrained by means of the electromagnetic brake 150, thereby admitting no restoring force of the spiral spring 143.

Simultaneously, the delay time set by the user counts down. The countdown of the delay time can be checked through the display part 35.

While the delay time is passing, at step S10, the microprocessor 31 determines whether the power source is supplied again through the signal received from the power source unit 10. If the power source is supplied again within the delay time because of a temporary power outage like a transient power failure or instantaneous voltage drop to allow the power source supply signal to be inputted to the microprocessor 31, the step S10 is returned to the step S5, and the relay 34 is kept turned "on" under the control of the microprocessor 31.

However, if the power source is not supplied again to thus allow the power source cutoff signal to be consistently inputted to the microprocessor 31, at step S11, the microprocessor 31 determines whether the delay time completely passes or not. If it is determined that the delay time does not completely pass, the step S11 is returned to the step S9, and if it is determined that the delay time completely passes, at step S12, the microprocessor 31 determines that an emergency occurs to allow the relay 34 to be turned "off", so that the power source supply to the electromagnetic brake 150 from the charge unit 20 is cut off.

As a result, the ring gear 135 of the planetary gear unit 130 is released from the restraint so that the spiral spring 143 is untightened to the initial state to allow the valve to forcedly rotate to the fail open or closed state.

As described above, the emergency control device and method for the spring return valve actuator according to the present invention can allow the electromagnetic brake to consistently restrain the spiral spring using the electrical energy stored in the charge unit for the given set delay time even if the power source is cut off by means of the occurrence of an emergency like a power outage.

In case of a temporary power outage like a transient power failure or instantaneous voltage drop that can be normalized as soon as possible, accordingly, the emergency control device and method according to the present invention can avoid the valve from being returned to the fail open or closed state.

In addition, the emergency control device and method according to the present invention can in advance prevent unnecessary power, time and labor consumption for returning the valve being already in the fail open or closed state even because of the transient power failure to its normal state by means of the motor or manually.

Further, the emergency control device and method according to the present invention can set the given power source cutoff delay time for the electromagnetic brake by the user, so that if power qualities by district are remarkably different or deteriorated or if power consumption excessively increases to frequently cause a transient power failure or instantaneous voltage drop, the given power source cutoff delay time can be set appropriately based on accumulated data, thereby allowing the valve to be operated more efficiently.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An emergency control device for a spring return valve actuator including a motor adapted to open and close a valve, a spiral spring adapted to forcedly open and close the valve if an emergency occurs, and an electromagnetic brake adapted to allow the spiral spring to be fixed to a tightened state, the device comprising:
    a power source unit for receiving an alternating current (AC) power source, converting and stepping down an AC voltage of the received AC power source to a given direct current (DC) voltage, and supplying the given DC voltage, and transmitting a signal as to whether the power source is supplied;
    a charge unit for receiving the DC voltage from the power source unit to store electrical energy with a given voltage; and
    a control unit for receiving the DC voltage from the power source unit to supply the received DC voltage to the electromagnetic brake, and if a power source cutoff signal is received from the power source unit, for supplying the electrical energy stored in the charge unit to the electromagnetic brake for a given set time,
    wherein the power source unit comprises rectifying parts for converting the AC voltage of the AC power source into the DC voltage and a transforming part connected to an output side of the rectifying parts to step down the AC voltage of the AC power source to the given DC voltage and having an auxiliary winding provided on a secondary side thereof to transmit the signal as to whether the power source is supplied to the control unit.

2. The emergency control device according to claim 1, wherein the transforming part is composed of a switching transformer for performing constant current charging to the charge unit.

3. The emergency control device according to claim 1, wherein the charge unit is composed of a super capacitor.

4. The emergency control device according to claim 1, wherein the control unit comprises:
    a microprocessor;
    a voltage detecting part for measuring a charging voltage of the charge unit to transmitting the measured value to the microprocessor; and
    a delay time setting part for setting a given power source cutoff delay time for the electromagnetic brake if the power source supply to the power source unit is cut off.

5. The emergency control device according to claim 1, wherein the control unit further comprises a display part for displaying the charging voltage of the charge unit and the power source cutoff delay time for the electromagnetic brake.

6. The emergency control device according to claim 5, wherein the display part selectively displays the charging voltage of the charge unit and the power source cutoff delay time for the electromagnetic brake according to the signal as to whether the power source is supplied received from the power source unit.

7. An emergency control method for a spring return valve actuator including a motor adapted to open and close a valve, a spiral spring adapted to forcedly open and close the valve if an emergency occurs, and an electromagnetic brake adapted to allow the spiral spring to be fixed to a tightened state, the method comprising the steps of:

stepping down an alternating current (AC) power source to a given direct current (DC) voltage and supplying the DC voltage;

transmitting a signal as to whether the power source is supplied;

charging electrical energy to a capacitor with the stepped down DC voltage;

supplying the stepped down DC voltage to the electromagnetic brake after the charging to the capacitor is completed;

setting a power source cutoff delay time for the electromagnetic brake if the power source is cut off; and if a power source cutoff signal is received, supplying the electrical energy charged to the capacitor to the electromagnetic brake for the power source cutoff delay time set by a control unit.

8. The emergency control method according to claim 7, further comprising the step of measuring a charging voltage of the capacitor to output the measured value to the control unit, so that only when the charging voltage of the capacitor is more than a given voltage, the control unit supplies the charging voltage to the electromagnetic brake.

9. The emergency control device according to claim 7, further comprising the step of displaying the charging voltage of the capacitor and the power source cutoff delay time for the electromagnetic brake on a display part.

10. The emergency control method according to claim 9, wherein the control unit controls the display part to display the charging voltage of the capacitor if a power source supply signal is received and to display the power source cutoff delay time for the electromagnetic brake if the power source cutoff signal is received.

* * * * *